(12) United States Patent
Oliver

(10) Patent No.: US 12,049,871 B2
(45) Date of Patent: Jul. 30, 2024

(54) WIND TURBINE BLADE ANTI-ICE SYSTEMS

(71) Applicant: VESTAS WIND SYSTEMS A/S, Aarhus (DK)

(72) Inventor: Kevin John Oliver, East Cowes (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 323 days.

(21) Appl. No.: 17/417,072

(22) PCT Filed: Dec. 17, 2019

(86) PCT No.: PCT/DK2019/050398
§ 371 (c)(1),
(2) Date: Jun. 21, 2021

(87) PCT Pub. No.: WO2020/125895
PCT Pub. Date: Jun. 25, 2020

(65) Prior Publication Data
US 2022/0074392 A1  Mar. 10, 2022

(30) Foreign Application Priority Data
Dec. 20, 2018 (DK) .......................... PA 2018 70837

(51) Int. Cl.
*F03D 80/40* (2016.01)
*F03D 17/00* (2016.01)

(52) U.S. Cl.
CPC ............. *F03D 80/40* (2016.05); *F03D 17/00* (2016.05); *F05B 2260/80* (2013.01)

(58) Field of Classification Search
CPC ....... F03D 80/40; F03D 17/00; F05B 2260/80
(Continued)

(56) References Cited

U.S. PATENT DOCUMENTS

| 2013/0022465 A1* | 1/2013 | Stiesdal ................. B64D 15/12 |
| | | 416/95 |
| 2013/0022466 A1* | 1/2013 | Laurberg ................ F03D 80/40 |
| | | 219/539 |

(Continued)

FOREIGN PATENT DOCUMENTS

| CN | 102889175 A | 1/2013 |
| CN | 108474356 A | 8/2018 |

(Continued)

OTHER PUBLICATIONS

PCT International Search Report for Application No. PCT/DK2019/050398 dated Mar. 13, 2020.

(Continued)

*Primary Examiner* — Hung Q Nguyen
*Assistant Examiner* — Anthony Donald Taylor, Jr.
(74) *Attorney, Agent, or Firm* — Patterson + Sheridan, LLP

(57) ABSTRACT

A method of controlling a wind turbine blade anti-ice system comprising a power supply and a plurality of electrical blade heating devices. The method comprises—energising a selected one of the blade heating devices; measuring one or more electrical parameters associated with the selected one of the blade heating devices; determining the power of the selected one of the blade heating devices based on the one or more measured electrical parameters; and controlling the selected one of the blade heating devices based on the determined power draw. Beneficially the method of the invention provides for calibration of the electrical heating devices in situ during operation of the anti-ice system. Therefore, the performance of the heating devices may be assessed under a predetermined input electrical supply profile which enables the anti-ice system to be controlled more effectively.

14 Claims, 3 Drawing Sheets

(58) Field of Classification Search
USPC .............................................................. 416/1
See application file for complete search history.

(56) References Cited

U.S. PATENT DOCUMENTS

| | | | | |
|---|---|---|---|---|
| 2013/0026757 | A1* | 1/2013 | Peters | F03D 80/40 290/44 |
| 2014/0072429 | A1* | 3/2014 | Krainer | F03D 80/40 416/1 |
| 2015/0023792 | A1* | 1/2015 | Spitzner | F03D 80/40 416/1 |
| 2015/0292486 | A1* | 10/2015 | Zhou | F03D 80/40 702/35 |
| 2016/0040654 | A1* | 2/2016 | Cuoghi | F03D 80/40 416/61 |
| 2016/0084231 | A1* | 3/2016 | Runge | F03D 7/00 416/1 |

FOREIGN PATENT DOCUMENTS

| | | |
|---|---|---|
| CN | 108884812 A | 11/2018 |
| WO | 2017167347 A1 | 10/2017 |
| WO | WO2017167347 A1 * 10/2017 | ............. F03D 17/00 |
| WO | 2018113889 A1 | 6/2018 |
| WO | 2020125895 A1 | 6/2020 |

OTHER PUBLICATIONS

PCT Written Opinion of the International Searching Authority for Application No. PCT/DK2019/050398 dated Mar. 13, 2020.
Danish Patent and Trademark Office 1st Technical Examination Report for Application No. PA 2018 70837 dated Jun. 14, 2019.
European Patent Office, Communication Pursuant to Article 94(3) EPC for Application 19 823 906.3-1002 dated Jan. 2, 2023.
European Patent Office, Communication pursuant to Article 94(3) EPC for European Patent Application No. 19823906.3, dated Jan. 31, 2024.
Chinese Patent Office, First Office Action for Chinese Patent Application No. 201980089615.7, dated Jan. 23, 2024.

* cited by examiner

WIND TURBINE BLADE ANTI-ICE SYSTEMS

TECHNICAL FIELD

The invention relates to an anti-icing system for a wind turbine blade, and also to approaches for controlling such an anti-ice system. The invention also resides in a wind turbine and, indeed, a wind turbine blade incorporating such an anti-ice system.

BACKGROUND

Wind turbines may be required to operate in geographical areas which can experience very cold climatic conditions for at least parts of the year. Although the system components of a wind turbine are designed to operate in a variety of adverse climatic conditions, it is a well-known issue that icing of wind turbine blades can have a detrimental impact on the power generation efficiency of wind turbines. Ice accretion on the wind turbine blades increases blade mass but it also changes the aerodynamic profile of the blades therefore making them less efficient aerofoils. This results in the rotor producing less torque from a given wind speed so the power generation potential is reduced.

Various approaches have been developed to remove ice from wind turbine blades. For example, shaking devices can be installed on blades in an effort to impart violent oscillations to the blade structure in order to physically shake the ice from the blades.

Another approach is to implement an electrical heating system in or within the blades. For example, it is known to blow heated air into the hollow interior of the blade in order to raise the temperature of the blade surface sufficiently to prevent or reduce ice accretion. A further approach is to integrate electrical heating elements into the blade surface, and such a system is generally successful at preventing ice accretion. However, electrical heating elements tend to be extremely power hungry which is a challenge in terms of controlling them effectively to prevent ice build-up whilst keeping the power flow within limits determined by the power transfer system within the hub. Moreover, typically a blade will be equipped with several different heating devices spaced about the blade surface in order to provide heating in selected zones on the blade. Due to manufacturing issues, the heating devices will have electrical and mechanical characteristics which vary between devices, which adds a further challenge to the way in which the anti-ice system is controlled.

Is it with a view to addressing some of these problems that the embodiments of the invention have been devised.

SUMMARY OF THE INVENTION

Against this background, the invention provides a method of controlling a wind turbine blade anti-ice system comprising a power supply and a plurality of electrical blade heating devices. The method comprises—energising a selected one of the blade heating devices; measuring one or more electrical parameters associated with the selected one of the blade heating devices; determining the power of the selected one of the blade heating devices based on the one or more measured electrical parameters; and controlling the selected one of the blade heating devices based on the determined power draw.

Beneficially the method of the invention provides for calibration of the electrical heating devices in situ during operation of the anti-ice system. Therefore, the performance of the heating devices may be assessed under a predetermined input electrical supply profile which enables the anti-ice system to be controlled more effectively.

The steps of energising, measuring and determining may be performed in sequence for each one of a plurality of blade heating devices. In this way, calibration may be performed for each one of the heating devices separately using a reduced set of sensors. The calibration process may be run for each heating devices sequentially, and substantially immediately, one after another. Alternatively, the calibration process may be scheduled for each heating device at a predetermined time.

The step of energising a selected one of the blade heating devices may include activating a switch to provide power to that blade heating device. Therefore, the calibration process may be focused on one of the heating devices at a time.

The step of measuring the electrical parameters associated with the selected blade heating device may include changing the energisation of the blade heating device to cause a change in the one or more measured electrical parameters. For example, the applied voltage of a heat device may be varied in order to assess the performance of the heating device across a range of current loads.

The measured electrical parameters may include the voltage applied to the selected blade heating device and the current associated with the selected heating device. Likewise, measuring the current through the selected one of the blade heating devices may include taking an input current measurement in respect of the blade heating device and an output current measurement.

The step of controlling the selected blade heating device may include determining a maximum on-time for the selected blade heating device based at least in part on the determined power draw. Alternatively, or in addition, the step of controlling the selected blade heating device may include analysing the determined electrical parameters and/or the determined power over an extended time period in order to provide a diagnostic function.

The invention also extends to a wind turbine comprising a plurality of wind turbine blades, a blade anti-ice system including a plurality of blade heating devices, and a control system to control the plurality of blade heating devices and to provide power thereto, and further comprising a sensing arrangement to sense electrical parameters associated with the plurality of blade heating devices, and wherein the control system is operable to energise a selected one of the blade heating devices, to measure the electrical parameters thereof, to determine the power of the heating device based on the measured electrical parameters, and to control the heating device based on the determined power thereof. The control system includes a switching module comprising a plurality of switch devices, each being associated with a respective blade heating device, wherein the control system is operable to selectively operate one of the switch devices in order to selectively energise an associated blade heating device.

The sensing arrangement may include a voltage sensor to measure the applied voltage across a current supply line associated with the blade heating devices and a current return line from the blade heating devices. The sensing arrangement may further include a current sensor on the current supply line and/or a current sensor on the current return line.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A specific embodiment of the invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
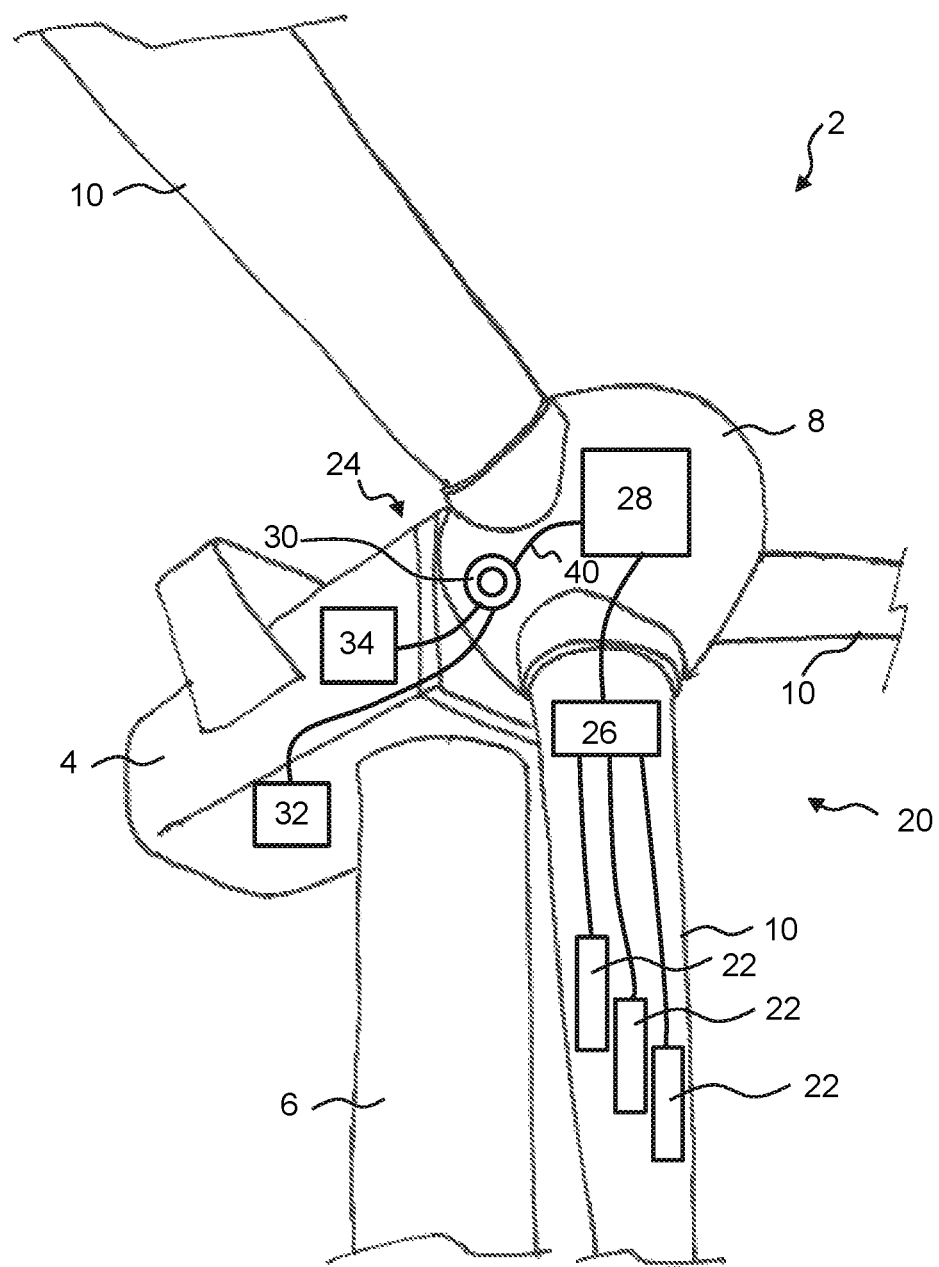
FIG. 1 is a perspective view of a wind turbine, including a nacelle, a hub and a set of blades, in which embodiments of the present invention may be implemented.

In order to place the embodiments of the invention in a suitable context, reference will firstly be made to FIG. 1, which shows a portion of a typical horizontal-axis wind turbine 2 (HAWT) in which the embodiments of the invention may be implemented.

In overview, the wind turbine 2 comprises a nacelle 4 rotatably coupled to the top of a tower 6 so that the nacelle 4 can slew left and right with respect to the tower 6. Although not shown in FIG. 1, the wind turbine 2 is mounted to a suitable foundation, which may be on-shore or off-shore depending on the requirements of the installation. Both installations would be familiar to the skilled person.

In the usual way, the nacelle 4 supports a rotor hub 8 to which is coupled a set of wind turbine blades 10. The illustrated wind turbine includes three blades, although it will be appreciated that this is merely an example and that a different number of blades is acceptable. In the usual way, a flow of wind acts on the blades 10 to create torque on the rotor hub 8, thereby rotating the rotor hub 8 and transmitting rotational movement to power generating equipment housed within the nacelle 4. The nacelle 4 houses many of the generating components of the wind turbine 2, including the generator, gearbox, drive train and brake assembly, as well as convertor and other electrical equipment for converting the mechanical energy of the wind into electrical energy for provision to the grid. Such components are conventional and so further detail has been omitted so as not to obscure the invention to the reader.

The wind turbine includes an electrical system and part of this electrical system is shown in FIG. 1 as a blade anti-icing system 20. At this point it should be appreciated that the electrical system of the wind turbine is shown in schematic form and so is simplified for the purposes of this description. In particular, the focus of this discussion is on the anti-ice system, which is emphasised in FIG. 1 in favour of other electric systems and components of the wind turbine, which are not shown or discussed here for the sake of clarity, but which would nevertheless be present in a real-life implementation.

As has been discussed above, cold climatic conditions may cause ice to gather onto the blades during operation and this phenomenon can have a detrimental effect on power generation. Principally this is because the build-up of ice changes the aerofoil profile of the blade which makes it less efficient at generating torque for a given wind speed. As a result, the amount of power generated by the wind turbine steadily reduces as ice builds up. This gradual loss of power generation is detectable by the control system of the wind turbine and can act as a trigger for activation of the anti-ice system.

The anti-ice system 20 provides a means to combat the build-up of ice on the surface of the blade. To this end the anti-ice system 20 may be operable to apply heat to the blade surface under various triggering conditions using one or more heating devices. For example, activation of the anti-ice system may occur when a certain ice threshold is detected. The supply of power to the heating devices may be regulated in various ways to achieve the required reduction in icing. For example, power supply may be applied to the heating devices gradually based on the detected or modelled temperature at the exterior blade surface. Alternatively, power may be applied to the heating devices at a maximum level for a predetermined period of time in order to achieve ice reduction. Such a power strategy may be applied periodically in order to keep the blade clear of ice.

In overview, the anti-ice system 20 comprises a plurality of electrical surface heating devices 22 that are electrically connected to a power and control system 24. The heating devices or 'elements' 22 may be in the form of electrically conductive mats, panels, nets or pads, which are generally known in the art. Alternatively, the electrical heating devices 22 may be a run of electrically resistive cable that is wound or routed in appropriate regions of the blade surface in order to generate heat at desired locations. A type of suitable electrical heating device is known from WO20171108064, which discloses electrical heating devices in the form of glass fibre mat coated with electrically conductive carbon.

In the illustrated embodiment, three heating devices 22 are provided in spaced apart locations along the blade. As shown in FIG. 1 the spacing of the heating devices 22 is for convenience only and does not indicate a particular spacing within the blade. Typically more than three heating devices would be provided, although this is not essential, and the heating devices may have an optimised spacing that is different to what is shown here. For example, between 10 and 40 heating devices may be incorporated in the blade, distributed between windward and leeward surfaces. Certain arrangements of heating devices may be devised in which less critical or vulnerable areas of the blade are not provided with heating devices, for example regions near to the blade root. However, it should be noted at this point that the spacing of the heating devices is not central to the invention and the previous arrangements are only provided by way of example.

Remaining with the schematic system view of FIG. 1, the power and control system 24 for the heating devices 22 includes, in overview, a blade power control module 26, a hub power control module 28, a power transfer arrangement 30, a power supply or source 32 and a system controller 34.

It should be appreciated at this point that the anti-ice system 20 is only shown here for one of the blades and that, in practice, each blade would have suitable components to apply heating to the blade. The various electrical and electronic components referred to above are coupled together as appropriate by suitable power and control cables and/or busbars so that power and control signals may be transferred between the respective components as required.

The power transfer arrangement 30 is a rotating interface between the rotating hub 8 and the stationary nacelle 4. Such a component is conventional and so a full discussion is not required here. However, such a component typically takes the form of a slip ring arrangement which is able to transfer electrical power from a nacelle-based power input and provide a power output into the rotating structure of the hub for supplying power to whichever power consumers are located in the hub. One such power consumer is the hub-based components of the anti-ice system 20.

The power transfer arrangement 30 may transfer DC and/or AC power. Typically, AC power will be transferred either as a single phase or as three phases.

The power transfer arrangement 30 is also able to transfer electronic signals across the rotating interface. As such the power transfer arrangement 30 is shown here as receiving a first input from the power source 32 and a second input from the system controller 34.

Conversely, the power transfer arrangement 30 provides an output 40 to the hub power control module 28. The output 40 provides power but also may provide electronic signals. It should be noted that although electronic control signals may be transferred by a hardwired network, it is also possible for those electronic control signals to be transferred by way of a wireless network.

The system controller 34 controls the operation of the anti-ice system 20 and may be embodied in different ways. As shown here, the system controller 34 is based in the nacelle 4. However, this is not essential and the system controller 34 may instead be based in the rotor hub 8. The functionality provided by the system controller 34 may, moreover, be provided by a main wind turbine controller (not shown) or the system controller 34 may be a dedicated control unit for controlling the anti-ice system only. Irrespective of the physical location of the system controller 34 it will be appreciated that it provides a suitable processing environment and associated computational, memory and input/output components in order to control and communicate with the various components of the anti-ice system.

The system controller 34 receives inputs (not shown) regarding the operation of the wind turbine, and its operational environment, and performs processing to determine the desired activation strategy for the electrical heating devices 22. For example, based on the measured or the modelled outside air temperature and power generation values, the system controller 34 may determine that at least one of the electrical heating devices 22 should be activated.

Further determination may be made about the timings for which the one or more heating devices 22 are activated. For example, the system controller 34 may command the electrical heating devices to be operated for a predetermined time period in order to generate a predetermined thermal power output. Furthermore, the system controller 34 may command an activation duty cycle to be implemented in order to maintain a predetermined average power output. Such a strategy is described in WO2017/108064.

The hub power control module 28 is located in the hub 8 and provides a power distribution function for the anti-ice system components that are located in the blades. The hub power control module 28 receives an input from the power transfer arrangement 30 and distributes electrical power to the heating devices 22. The precise configuration of the hub power control module 28 is not central to the invention, and the general form is conventional. However, it should be capable of selectively distributing power to the heating devices within the blades The blade power control module 26 has the functionality of receiving a power input from the hub power control module 28 and distributing power between the electrical heating devices 22 within the respective blade. Therefore, each blade power control module 26 incorporates the required switching units and sensors in order to selectively activate and monitor the electrical heating devices 22.

Figure 2:
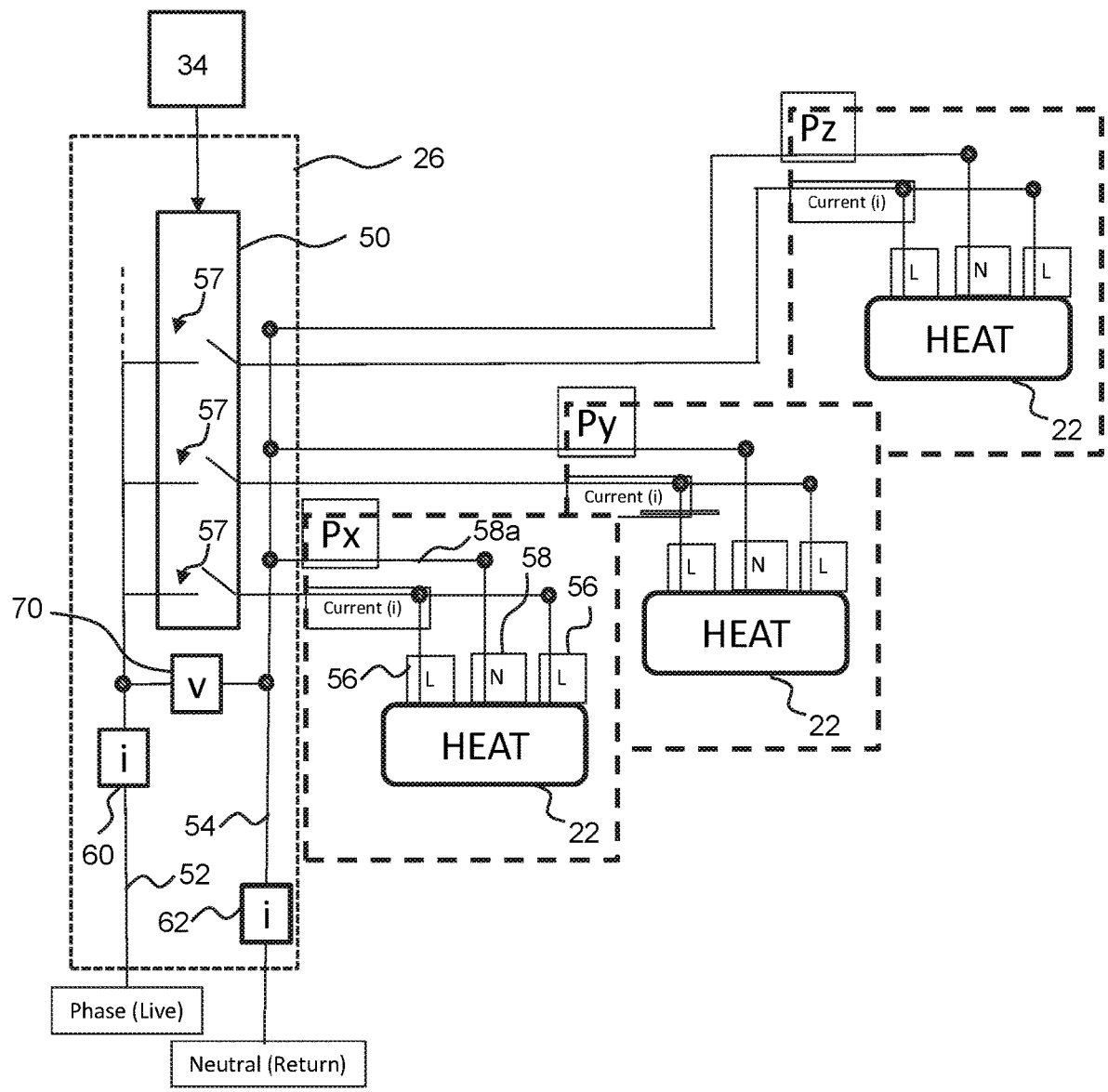
FIG. 2 is a schematic view of a blade anti-ice system in accordance with an embodiment of the invention.

FIG. 2 illustrates features of the blade power control module 26 and the electrical heating devices 22 in more detail. Here, the blade power control module 26 includes a switching unit 50 that selectively powers the three blade heating devices 22.

One challenge relating to the objective of powering and controlling such electrical heating devices is that the electrical characteristics can vary between devices. Typically this is due to material variances that arise during manufacture. For example, heating mats using carbon fibre-based conductive material are observed to exhibit around 5-10% variation in their electrical resistance between devices. Such a variation can have a significant impact on the electrical current drawn by each heating device given a predetermined applied voltage. When considered in the context of an entire anti-ice system that may have a nominal power draw potential of around 50 kW or more, a 5-10% variation in electrical resistance of the heating mats is significant. This variation would normally be considered in designing the system to ensure the system does not exceed safe limits. This, however, results in a system that is sub-optimal in performance and non-uniform in application.

To guard against these issues, the embodiments of the invention provide a system and a control process that is configured to quantify and adapt to the changes in electrical characteristics to ensure proper operation.

Referring to FIG. 2, the switching unit 50 is shown as being under the control of the system controller 42 and therefore receives a control signal input from it. Based on these control inputs the switching unit 50 is operable to control the current flow to each of the heating devices 22 that are connected to it. In addition to communicating control signals to the switching unit 50, the system controller 34 also receives data signals from sensing devices associated with the anti-ice system 20. Here, the sensing devices sense electrical parameters associated with the input voltage and current for the electrical heating devices 22.

As can be seen in FIG. 2, the blade power control module 26 includes an input current line 52, and an output current or 'ground' line 54. The input current line 52 is connected, via the switching unit 50, to electric power inputs 56 of each one of the electrical heating devices 22. Only two of the power inputs 56 are indicated on FIG. 2 for clarity. Electrical switches 57 are provided by the switching unit 50 to provide control over the activation of each of the electric heating devices 22. In the illustrated embodiment, each switch 57 is associated with a single electric heating device 22. However, it should be noted that a switch 57 could also be associated with a group of heating devices. It is envisaged that most suitable would be an electronically controlled semiconductor switch, although other switch configurations would be acceptable. It should be noted at this point that the system controller 34 may control the switches 57 through a suitable communications link to the blade power control module 26.

The output current line 54 is connected to a power return connection 58 (only one of which is shown here, for clarity) of each electrical heating device 22 and therefore provides a neutral connection. It will therefore be appreciated that current is able to flow along input current line 52, through the switching unit 50 and to the electric power inputs 56 of the heating devices. From there, current flows from the power return connection 58 to the output current line 54.

In order to monitor the power flow to the electrical heating devices 22, the blade power control module 26 is provided with a first current sensor 60 and a second current sensor 62. It should be noted at this point that the two current sensors are not needed to monitor the current flowing through the devices, as only a single current sensor on either the input or output current lines 52,54 would be sufficient. However, provision of both current sensing devices provides redundancy and also a means for the control system to verify correcting functioning of both sensors.

The first current sensor 60 is configured and arranged to monitor the current flowing through the input current line 52. Similarly the second current sensor 62 is associated with the output current line 54 for monitoring the current flow therethrough. Any suitable current sensor/transducer would be acceptable, for example based on Hall effect, inductive or magnetoresistive sensing principles.

In addition to the two current sensors, there is also provided a voltage sensor 70. The voltage sensor is arranged and configured to measure the applied voltage between the input current line 52 and the output current line 54. In a similar manner to the current sensors, any suitable voltage sensor may be used, for a resistive or capacitive voltage sensor.

Although not shown here, it should be appreciated that the first and second current sensors 60,62 and the voltage sensor 70 are configured to communicate with the system controller 34 in order to provide it with measurements about the performance of the heating devices 22. To this end, the sensors may be coupled to the system controller 34 by a wired or wireless connection.

By virtue of the provision of the current sensor 60,62 and the voltage sensor 70, the system controller 34 is able to measure the actual current that is flowing through the heating devices 22 and therefore also calculate the actual electrical power that is being dissipated which will be proportional to the heating power. Beneficially, therefore, the system controller 34 is able to carry out a calibration process to determine the actual power drawn by the electrical heating devices 22 compared to the expected power draw based on their theoretical electrical specification.

The system controller 34 is configured to operate each of the switches 57 of the switching unit 50 in order to activate selected ones of the electrical heating devices 22 for calibration. For example, in order to calibrate the first electrical heating device 22 (identified specifically by the label Pz), the system controller 34 would configure the uppermost switch 57 into a closed position and configure the middle switch 57 and the lower most switch 57 into the open position. Since only one of the electrical heating devices 22 is activated, the applied voltage is across only that single switch and so electrical current will flow from the input current line 52, through a single switch 57 and electrical heating device 22, and to the output current line 54, The system controller 34 is therefore able to monitor the voltage sensor 70 and either one of the two current sensors 60,62 and determine the electrical power consumed by the electrical heating device (based on the relationship $P=VI$) and also the power dissipated by the electrical heating devices as thermal energy (based on the relationship $P=I^2R$).

The system controller 34 may carry out a calibration process at repeated intervals. For example, the process may be carried out when the wind turbine is started following a maintenance event. Alternatively, the process may be carried out based on a predetermined schedule, or on command as triggered manually e.g. over a SCADA interface with the wind turbine main control centre. By virtue of the above discussion, therefore, the system controller 34 applies a dynamic calibration process to the electric heating devices 22 in which selected heating devices can be selected in turn so as to gather data of the associated electrical characteristics through which process the devices can be controlled more effectively.

The calibration process may involve all of the electrical heating devices 22 being calibrated during a single session. However, since this may take a significant period of time, one option is to implement a 'rolling calibration process' in which the system controller 34 cycles the calibration of the electrical heating device 22.

Using the calibrated electrical parameters of the electrical heating devices 22, the system controller 34 is able to calculate an accurate measurement of the electrical power drawn by each electrical heating device 22 when it is activated with a given supply voltage. The system controller 34 may therefore store the calibrated electrical parameters in a suitable processor memory for use in subsequent calculations relating to safe operation of the electrical heating devices 22.

Figure 3:
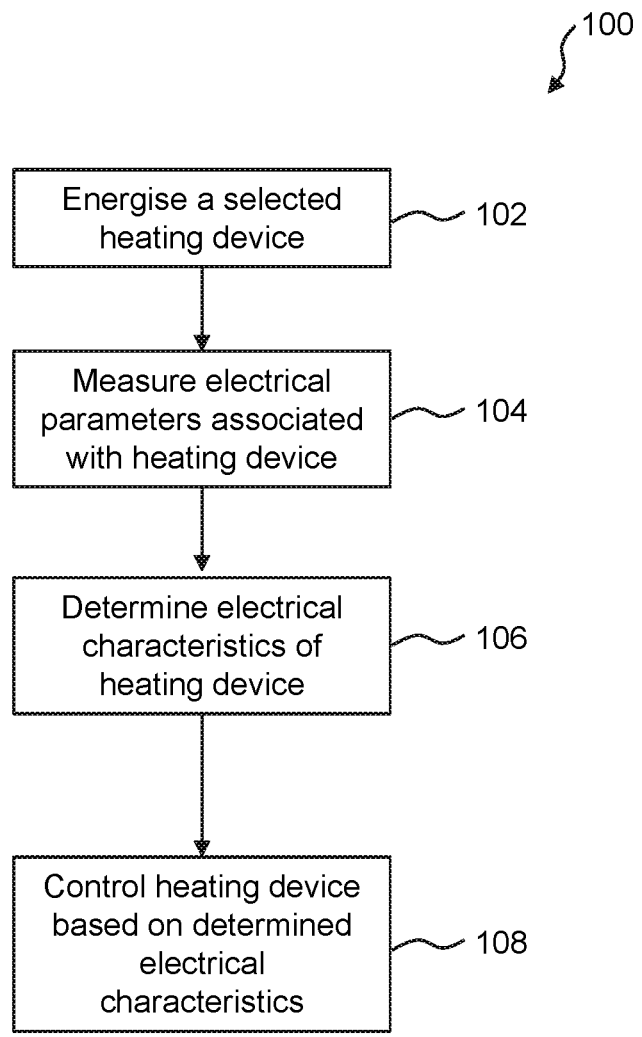
FIG. 3 is a flow chart depicting a method according to an embodiment of the invention.

The above procedure may be expressed as a process flow diagram. Therefore, with reference to FIG. 3, the system controller 34 may be considered to implement the functionality expressed by a control process 100 with which the system controller is able to determine electrical characteristics of the anti-ice system more accurately, and as a result is able to control the anti-ice system more effectively.

The control process 100 beings at step 102 at which the system controller 34 energises a selected heating device 22. As has been mentioned above, it is envisaged that a single one of the electrical heating devices 22 would be activated at a time in order for the voltage and current to be measured in respect of that heating device. However, it should be noted that a more complex and therefore more costly and possibly less reliable sensing mechanism could be envisaged that would enable multiple electrical devices to be analysed simultaneously. For example, current and voltage sensors could be installed on the respective power return connection 58 associated with each heating device or on the individual connection lines 58*a* extending to the main power return line 64.

Once the selected heating device 22 has been activated, the system controller 34 is then able, at step 104, to determine the voltage applied to the selected electrical heating device 22 and the current drawn by it. Suitably, those parameters may be stored in memory for later use. Moreover, those determined parameters may be stored in an appropriate log, as this may be useful in long term diagnosis of the health of the heating devices.

Once the voltage and current associated with the selected electrical heating device 22 have been determined, the system controller 34 then is able to calculate, at step 106, the necessary electrical characteristics of the heating device 22. For example, this may be the power draw in respect of the predetermined voltage. During the calibration process therefore, the system controller 34 may activate the heating device with a range of discrete applied voltages and to determine the power draw for each voltage level.

Finally, the system controller 34 is operable to control, at step 108, the anti-ice system based on the determined characteristics of the selected electrical heating device. It should be noted that the process 100 may be repeated for different ones of the electrical heating devices.

In terms of control over the electrical heating devices, the system control 34 may use the determined electrical characteristics in the following non-limiting use cases:

The system controller 34 may calculate the maximum 'on time' for which the electrical heating devices 22 may be activated without negatively affecting the electrical supply equipment or causing over temperature conditions within the blade. The calculated maximum on-time may therefore be implemented as an auto-reset threshold time period, which would trigger rest of the electrical heating devices 22 if the threshold was exceeded.

The system controller 34 may also implement a more reliable maximum power threshold. Since the system controller 34 is able to calculate the actual power draw of each of the electrical devices, it is able to track accurately the total power draw of the electrical devices to ensure that the total power draw does not exceed the power limit of the power transfer arrangement 30, for example.

Using the calibrated electrical parameters, the system controller 34 is able to calculate a more accurate 'on time' for the electrical devices, based on a predetermined applied voltage, in order to achieve a required heat output for the devices. Therefore, if the structure of an electrical heating device is such that it draws less power than its 'rated' specification, then the system controller 34 is able to extend the on-time in order to provide the required heating effect for the device, thereby improving the operation and uniformity of the anti-ice system.

The system controller 34 may perform trending calculations over a plurality of calibration processes to monitor the performance of the electrical heating devices. Anomalous readings may be reported to an operator by way of an error log or SCADS, interface.

The invention has been devices above through a discussion of illustrated embodiments, by way of example. Some variants on the specific embodiments have been mentioned above, but the skilled person would be appreciated that other variations and modifications not mentioned here could be made to the specific embodiments without departing from the scope of the invention as defined by the claims.

The invention claimed is:

1. A method of controlling a wind turbine blade anti-ice system, the system comprising a power supply and a plurality of electrical blade heating devices, wherein the method comprises:
    energising a selected one of the blade heating devices;
    measuring one or more electrical parameters associated with the selected one of the blade heating devices;
    determining a power draw of the selected one of the blade heating devices based on the one or more measured electrical parameters;
    determining a maximum on-time for the selected one of the blade heating devices based at least in part on the determined power draw, wherein in response to the determined power draw being less than a rated power draw of the selected one of the blade heating devices, the maximum on-time for the selected one of the blade heating devices is extended; and
    controlling an operation of the selected one of the blade heating devices based on the determined maximum on-time for the selected one of the blade heating devices.

2. The method of claim 1, wherein the method is performed in a sequence for each one of the plurality of electrical blade heating devices.

3. The method of claim 1, wherein energising the selected one of the blade heating devices includes activating a switch to provide power to the selected one of the blade heating devices.

4. The method of claim 1, wherein measuring the one or more electrical parameters associated with the selected one of the blade heating devices includes changing the energisation of the selected one of the blade heating devices to cause a change in the one or more electrical parameters.

5. The method of claim 1, wherein the one or more measured electrical parameters includes a voltage applied to the selected one of the blade heating devices and a current through the selected one of the blade heating devices.

6. The method of claim 5, wherein measuring the current through the selected one of the blade heating devices includes taking an input current measurement and an output current measurement.

7. The method of claim 1, wherein controlling the operation of the selected one of the blade heating devices includes analysing the one or more measured electrical parameters and/or the determined power draw over an extended period of time in order to provide a diagnostic function.

8. A wind turbine, comprising:
    a plurality of wind turbine blades;
    a blade anti-ice system including a plurality of blade heating devices;
    a control system to control an operation of the plurality of blade heating devices and to provide power thereto; and
    a sensing arrangement to sense electrical parameters associated with the plurality of blade heating devices;
    wherein the control system is operable to energise a selected one of the blade heating devices, to measure the electrical parameters associated with the selected one of the blade heating devices, to determine a power draw of the selected one of the blade heating devices based on the measured electrical parameters, to determine a maximum on-time for the selected one of the blade heating devices based at least in part on the determined power draw, wherein in response to the determined power draw being less than a rated power draw of the selected one of the blade heating devices, the maximum on-time for the selected one of the blade heating devices is extended, and to control the operation of the selected one of the blade heating devices based on the determined maximum on-time for the selected one of the blade heating devices.

9. The wind turbine of claim 8, wherein:
    the control system includes a switching module comprising a plurality of switch devices, each switch device of the plurality of switch devices being associated with a respective one of the blade heating devices, such that the control system is operable to selectively energise the respective one of the blade heating devices via the switch device; and
    the sensing arrangement includes a voltage sensor to measure an applied voltage across a current supply line to the blade heating devices and a current return line from the blade heating devices.

10. The wind turbine of claim 8, wherein the control system includes a switching module comprising a plurality of switch devices, each switch device of the plurality of switch devices being associated with a respective one of the blade heating devices, such that the control system is operable to selectively energise the respective one of the blade heating devices via the switch device.

11. The wind turbine of claim 8, wherein the sensing arrangement includes a voltage sensor to measure an applied voltage across a current supply line to the blade heating devices and a current return line from the blade heating devices.

12. The wind turbine of claim 11, wherein the sensing arrangement further includes a current sensor on the current supply line and/or a current sensor on the current return line.

13. The wind turbine of claim 8, wherein the maximum on-time is implemented as an auto-reset threshold time period, such that the other blade heating devices of the plurality of blade heating devices are activated if the auto-reset threshold time period is exceeded.

14. The method of claim 1, wherein the maximum on-time is implemented as an auto-reset threshold time period, such that the other blade heating devices of the plurality of electrical blade heating devices are activated if the auto-reset threshold time period is exceeded.

* * * * *